Figure 1:
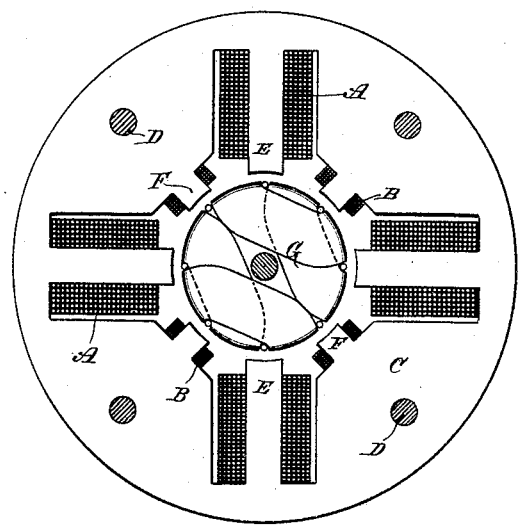

(No Model.)

N. TESLA.
ELECTRO MAGNETIC MOTOR.

No. 416,193. Patented Dec. 3, 1889.

Witnesses:
Raphael Netter
Robt. F. Gaylord

Inventor
Nikola Tesla
By
Duncan, Curtis & Page
Attorneys.

UNITED STATES PATENT OFFICE.

NIKOLA TESLA, OF NEW YORK, N. Y., ASSIGNOR TO THE TESLA ELECTRIC COMPANY, OF SAME PLACE.

ELECTRO-MAGNETIC MOTOR.

SPECIFICATION forming part of Letters Patent No. 416,193, dated December 3, 1889.

Application filed May 20, 1889. Serial No. 311,415. (No model.)

*To all whom it may concern:*

Be it known that I, NIKOLA TESLA, a subject of the Emperor of Austria, from Smiljan, Lika, border country of Austria-Hungary, residing at New York, in the county and State of New York, have invented certain new and useful Improvements in Electro-Magnetic Motors, of which the following is a specification, reference being had to the accompanying drawings.

This invention relates to alternating-current motors of the general description invented by me, and in which two or more energizing-circuits are employed, through which alternating currents differing in phase are passed, with the result of producing a progressive shifting or rotation of the poles or points of maximum attractive effect.

In prior patents and applications I have shown and described various forms of motors of this kind.. Among them are motors in which both energizing-circuits are electrically alike—that is to say, both have the same or approximately the same electrical resistance and self-induction—in the operation of which the alternating currents used are primarily of different phase. In others the difference of phase is artificially produced—as, for instance, in cases where the motor-circuits are of different resistance and self-induction, so that the same current divided between them will be retarded in one to a greater extent than in the other, and the requisite phase difference secured in this way. To this latter class generally my present invention relates.

The lag or rotation of the phases of an alternating current is directly proportional to the self-induction and inversely proportional to the resistance of the circuit through which the current flows. Hence, in order to secure the proper difference of phase between the two motor-circuits, it is desirable to make the self-induction in one much higher and the resistance much lower than the self-induction and resistance, respectively, in the other. At the same time the magnetic quantities of the two poles or sets of poles which the two circuits produce should be approximately equal. These requirements, which I have found to exist in motors of this kind, have led me to the invention of a motor having the following general characteristics: The coils which are included in that energizing-circuit which is to have the higher self-induction I make of coarse wire, or a conductor of relatively low resistance, and I use the greatest possible length or number of turns. In the other set of coils I use a comparatively few turns of finer wire or a wire of higher resistance. Furthermore, in order to approximate the magnetic quantities of the poles excited by these coils, I use in the self-induction circuit cores much longer than those in the other or resistance circuit. I have shown in the drawings a motor embodying these features.

Figure 2:
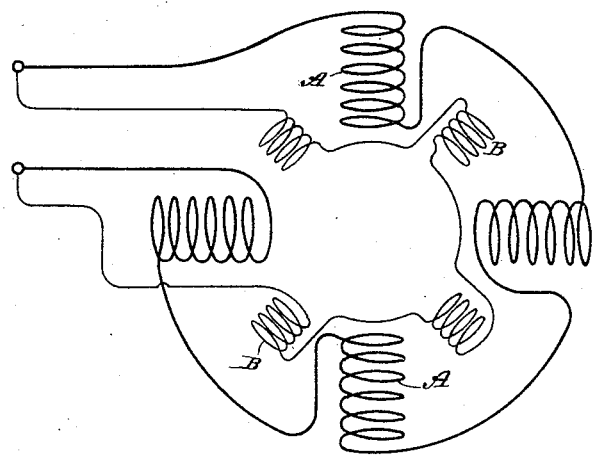

Figure 1 is a part-sectional view of the motor at right angles to the shaft. Fig. 2 is a diagram of the field-circuits.

In Fig. 2, let A represent the coils in one motor-circuit, and B those in the other. The circuit A is to have the higher self-induction. I therefore use a long length or a large number of turns of coarse wire in forming the coils of this circuit. For the circuit B, I use a smaller conductor, or a conductor of a higher resistance than copper, such as German silver or iron, and wind the coils with fewer turns. In applying these coils to a motor I build up a field-magnet of plates C, of iron or steel, secured together in the usual manner by bolts D. Each plate is formed with four (more or less) long cores E, around which is a space to receive the coil and an equal number of short projections F to receive the coils of the resistance-circuit. The plates are generally annular in shape, having an open space in the center for receiving the armature G, which I prefer to wind with closed coils. An alternating current divided between the two circuits is retarded as to its phases in the circuit A to a much greater extent than in the circuit B. By reason of the relative sizes and disposition of the cores and coils the magnetic effect of the poles E and F upon the armature closely approximate. These conditions are well understood and readily secured by one skilled in the art.

An important result secured by the construction herein shown of the motor is, that these coils which are designed to have the higher self-induction are almost completely surrounded by iron, by which the retardation is considerably increased.

I do not claim herein, broadly, the method and means of securing rotation by artificially producing a greater lag of the current in one motor-circuit than in the other, nor the use of poles or cores of different magnetic susceptibility, as these are features which I have specially claimed in other applications filed by me.

What I claim is—

1. An alternating-current motor having two or more energizing-circuits, the coils of one circuit being composed of conductors of large size or low resistance and those of the other of fewer turns of wire of smaller size or higher resistance, as set forth.

2. In an alternating-current motor, the combination, with long and short field-cores, of energizing-coils included in independent circuits, the coils on the longer cores containing an excess of copper or conductor over that in the others, as set forth.

3. The combination, with a field-magnet composed of magnetic plates having an open center and pole-pieces or cores of different length, of coils surrounding said cores and included in independent circuits, the coils on the longer cores containing an excess of copper over that in the others, as set forth.

4. The combination, with a field-magnet composed of magnetic plates having an open center and pole-pieces or cores of different length, of coils surrounding said cores and included in independent circuits, the coils on the longer cores containing an excess of copper over that in the others and being set in recesses in the iron core formed by the plates, as set forth.

NIKOLA TESLA.

Witnesses:
ROBT. F. GAYLORD,
FRANK E. HARTLEY.